United States Patent [19]

Guthrie et al.

[11] 4,111,043
[45] Sep. 5, 1978

[54] TURBINE FLOWMETER

[75] Inventors: James F. Guthrie; Richard E. Zimmerman, both of Tempe, Ariz.

[73] Assignee: Flow Technology, Inc., Phoenix, Ariz.

[21] Appl. No.: 800,557

[22] Filed: May 25, 1977

[51] Int. Cl.[2] .......................... G01F 1/115; G01F 7/00
[52] U.S. Cl. ..................................... 73/197; 73/231 R
[58] Field of Search ............. 73/195, 197, 230, 231 R, 73/194 R

[56] References Cited

U.S. PATENT DOCUMENTS

| | | | |
|---|---|---|---|
| 1,286,942 | 12/1918 | Chrisman | 73/197 |
| 1,934,948 | 11/1933 | Perrine | 73/197 |
| 2,078,837 | 4/1937 | Carter | 73/194 R X |
| 3,555,901 | 1/1971 | Delatorre et al. | 73/197 |

OTHER PUBLICATIONS

"Two Range Flow Rate & Totalizing System," from "Instruments & Automation," vol. 30, pp. 276-278, (2-1957).

*Primary Examiner*—James J. Gill
*Attorney, Agent, or Firm*—Christie, Parker & Hale

[57] ABSTRACT

A turbine wheel is insertable in a line to intercept fluid flowing therethrough. A pickup coil senses the rotation of the turbine wheel. Responsive to the pickup coil when the rotational speed of the turbine wheel exceeds a predetermined safe limit, it is reduced to zero by closure of a gate that prevents further fluid flow through the passage in which the turbine wheel resides. Preferably, the gate comprises a sleeve that covers the housing in which the turbine wheel resides. In one embodiment, two turbine wheels having different rotational characteristics responsive to fluid flow are alternately gated open and closed, depending upon the fluid velocity.

17 Claims, 6 Drawing Figures

TURBINE FLOWMETER

BACKGROUND OF THE INVENTION

This invention relates to turbine flowmeters and, more particularly, to overspeed protection for a turbine flowmeter.

A turbine flowmeter has a rotatable turbine wheel positioned to intercept fluid flowing through a line. The turbine wheel rotates at a speed proportional to the fluid velocity. The rotation of the turbine wheel is sensed by a pickup coil, which provides pulses to actuate an indicator.

One class of turbine flowmeter is designed for insertion in a fluid flow line as a probe. Such a probe is generally designed to disturb fluid flow as little as possible. As a result, the turbine wheel is small and is usually supported for rotation by fragile ball bearings. Rotation of the turbine wheel at a speed above that for which the flowmeter is designed may damage the fragile ball bearings.

SUMMARY OF THE INVENTION

According to the invention, when the rotational speed of the turbine wheel of a turbine flowmeter exceeds a predetermined safe limit, a gate closes a passage through a housing in which the turbine wheel resides. As a result, damage to the fragile ball bearings of the turbine wheel is prevented. In the preferred embodiment, the gate takes the form of a sleeve that covers the housing in which the turbine wheel resides.

A feature of the invention is the provision of two turbine wheels having different rotational characteristics responsive to fluid flow, which are alternately gated open and closed, depending upon the fluid velocity. The result is a dual range flowmeter — one turbine wheel operating at low fluid velocity and the other turbine wheel operating at high fluid velocity. dr

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENTS

Figure 1:
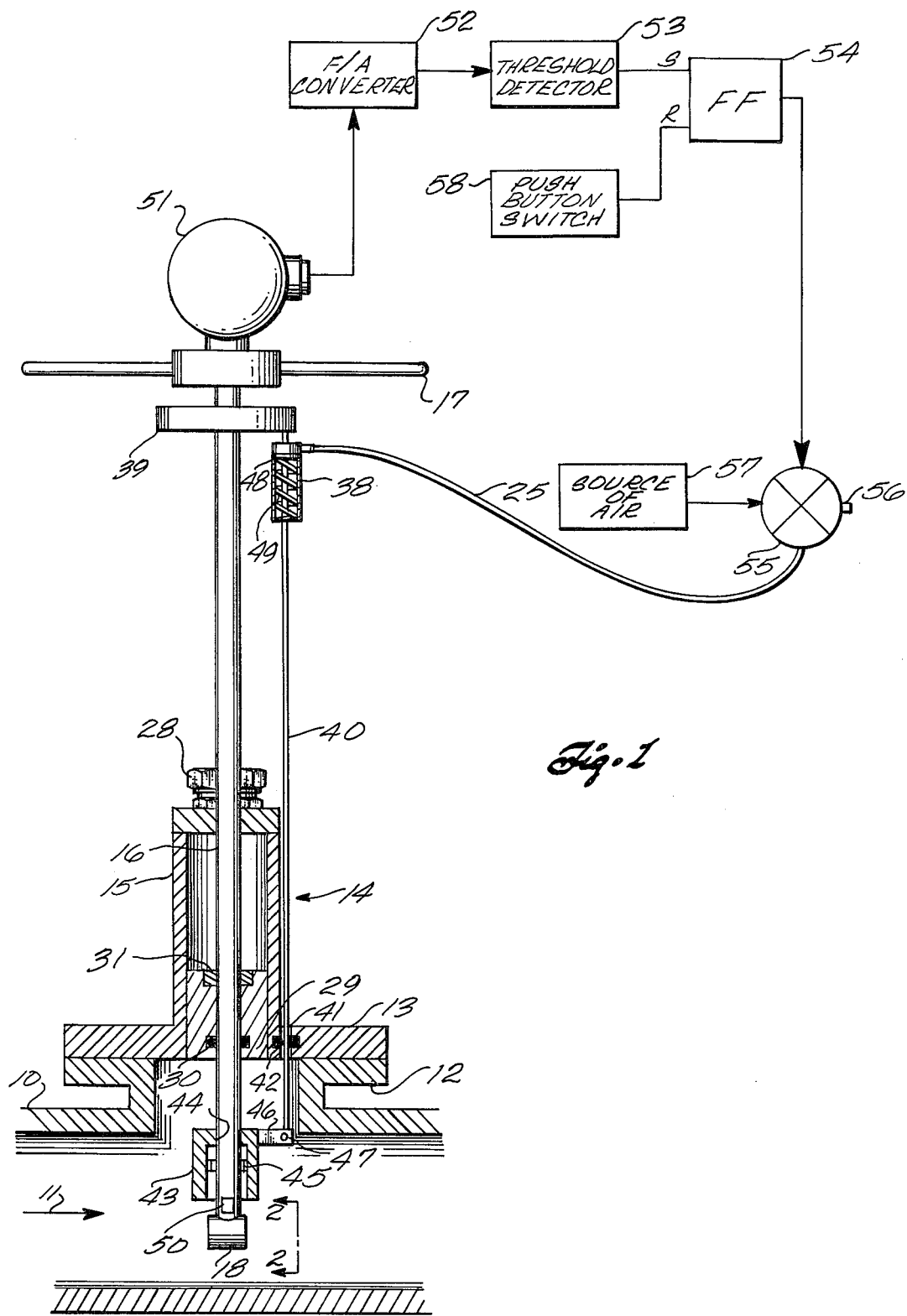
FIG. 1 is a side sectional view of one embodiment of a turbine flowmeter incorporating principles of the invention with electronic components shown in schematic form.

In FIG. 1, fluid flows through a line 10 in the direction of an arrow 11. Line 10 has a mounting flange 12 to which a mounting flange 13 of a flowmeter 14 is secured by fasteners (not shown). One end of a cylinder 15 is integral with mounting flange 13. A rod 16 extends through cylinder 15 from a point outside line 10 to a point inside line 10. The end of rod 16 outside line 10 has a handle 17. A cylindrical housing 18 is integral with the end of rod 16 inside line 10. The axis of housing 18 is transverse to the axis of rod 16.

Figure 2:
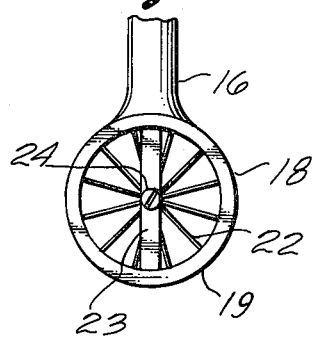
FIG. 2 is a front view of a portion of the flowmeter shown in FIG. 1.

As shown in FIG. 2, a turbine wheel 22 is disposed in a cylindrical passage 19, which extends through housing 18. Supporting bars 23 are affixed inside housing 18 on both sides of turbine wheel 22. Turbine wheel 22 has a shaft (not shown), which is journaled to freely rotate in supporting bars 23 by fragile ball bearings 24. Fluid in line 10 flows through passage 19 and around passage 19.

At one end, cylinder 15 has a SWAGE LOK compression fitting 28 to fix the axial position of rod 16 in line 10. At the other end, a plug 29 is secured to cylinder 15. Rod 16 extends through a passage in plug 29 with a loose fit. An O-ring 30 is retained in a groove near the bottom of plug 29 to prevent leakage of fluid between plug 29 and rod 16 into cylinder 15 from line 10. An annular insert 31 made of a low friction material, such as RULON, is fixed in a groove at the top of plug 29. Insert 31 fits snugly around rod 16. Rod 16 and cylinder 15 serve to insert turbine wheel 22 into line 10. To change the extent of insertion, fitting 28 is loosened and rod 16 is axially repositioned by pushing or pulling on handles 17, while insert 31 guides rod 16 through cylinder 15. Then, fitting 28 is tightened again.

Figure 3:
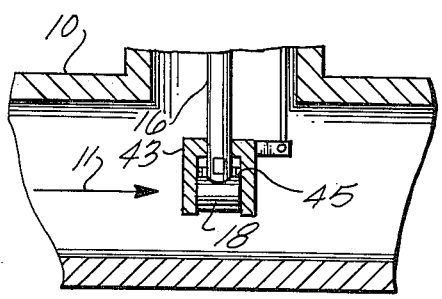
FIG. 3 is a side sectional view of a portion of the flowmeter of FIG. 1 after gate closure.

An air cylinder 38 is secured to a bracket 39 on rod 16 near handle 17. Air cylinder 38 has a movable arm 40 that extends parallel to rod 16 through a hole 41 in flange 13 to the interior of line 10. A seal 42 prevents leakage of fluid out of line 11 through hole 41. A movable cylindrical sleeve 43 is mounted on the end of rod 16 inside line 10. Sleeve 43, which is dimensioned to fit over housing 18, assumes one of two stable positions. Sleeve 43 normally lies above housing 18 in a first stable position, as shown in FIG. 1. At one end, sleeve 43 has an opening 44 that fits snugly around rod 16. An annular rider 45, which also fits snugly around rod 16, is secured to the inside of sleeve 43. A bracket 46, which is integral with sleeve 43, is connected by a pin 47 to arm 40. Within cylinder 38, arm 40 is attached to a piston 48, which is normally biased by a spring 49 to hold arm 40 so sleeve 43 lies above housing 18, as shown in FIG. 1. When compressed air is supplied to cylinder 38 by a hose 25 on the side of piston 48 opposite to spring 49, the force of spring 49 is overcome and arm 40 moves downwardly, as viewed in FIG. 1, to push sleeve 43 over housing 18, as depicted in FIG. 3, into a second stable position. This cuts off fluid flow through housing 18 without diverting the fluid flowing through line 10 around passage 19 and thus reduces the rotational speed of turbine wheel 22 to zero. Sleeve 43 is guided by opening 44 and rider 45, as it moves axially along rod 16.

A pickup coil designated schematically at 50 in FIG. 1 is disposed in close proximity to turbine wheel 22. Each time a blade of turbine wheel 22 passes pickup coil 50, a pulse is generated by pickup coil 50. The pulses are transmitted by wires passing through rod 16 to pulse shaping circuitry in a spherical housing 51 next to handle 17. The shaped pulses are applied to a frequency-to-analog (F/A) converter 52 which produces an analog signal proportional to the frequency of such pulses. The output of frequency-to-analog converter 52 is connected to a threshold detector 53. When the amplitude of the analog signal exceeds a predetermined value representative of a safe limit on the rotational speed for turbine wheel 22, threshold detector 53 produces a trigger pulse, which is applied to the S input of a flip-flop 54. The output of flip-flop 54 is applied as a control signal to a solenoid valve 55 having an exhaust port 56.

A source of compressed air 57 is coupled to the inlet of valve 55 and hose 25 is coupled to the outlet of valve 55. Normally, the output of flip-flop 54 is not energized, and hose 25 is connected to exhaust port 56. When threshold detector 53 produces a trigger pulse, flip-flop 54 is set, its output is energized, and valve 55 connects source of air 57 to hose 25, thereby extending arm 40 of air cylinder 38. A pushbutton switch 58 is connected to the reset input of flip-flop 54. When the pushbutton is depressed, the switch produces a trigger pulse that resets flip-flop 54 and deenergizes its output. Thus, once the safe speed limit is exceeded, turbine wheel 22 is not rendered operative again until pushbutton switch 58 is actuated.

To summarize, turbine wheel 22 is normally located in line 10 with its axis of rotation parallel to the direction of fluid flow through line 10, and with sleeve 43 above housing 18, as depicted in FIG. 1. In this position, turbine wheel 22 intercepts the fluid flowing through line 10 and rotates responsive to the intercepted fluid at a speed proportional to the fluid velocity. When the safe speed limit of turbine wheel 22 is exceeded, sleeve 43 is slid axially along rod 16 by air cylinder 38 until it covers housing 18, as depicted in FIG. 3. Sleeve 43 functions as a gate to cut off fluid flow through passage 19 and turbine wheel 22 when closed. This reduces the rotational speed of turbine wheel 22 to zero and thus protects ball bearings 24 from damage. (Alternatively, if desired, sleeve 43 could be slid along rod 16 to only partially cover housing 18 and passage 19, thereby reducing the rotational speed of turbine wheel 22, but not to zero.) Sleeve 43 remains in the position depicted in FIG. 3 until the reset button is pushed.

Figure 6:
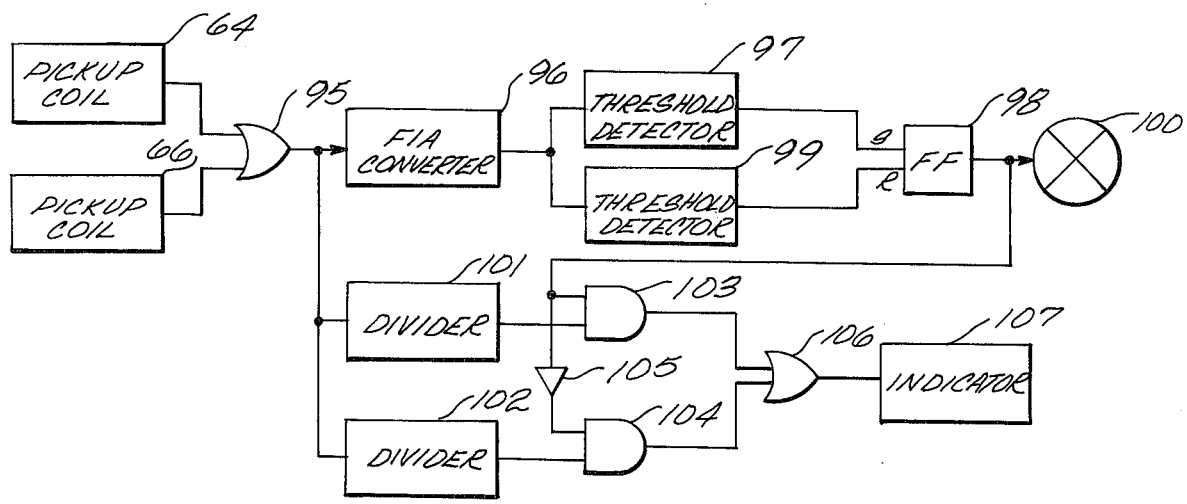
FIG. 6 is a schematic block diagram of the electronic components utilized in connection with the embodiment of FIG. 4.
Figure 4:
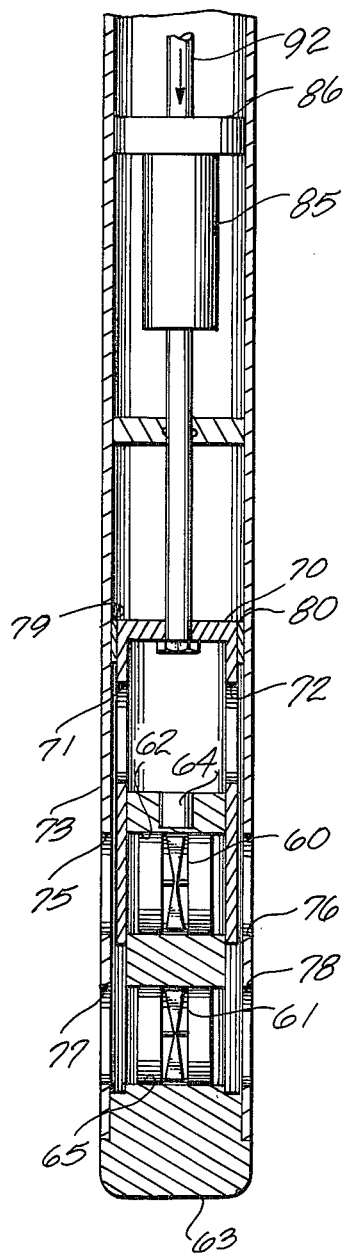
FIG. 4 is a side sectional view of another embodiment of a turbine flowmeter incorporating principles of the invention.
Figure 5:
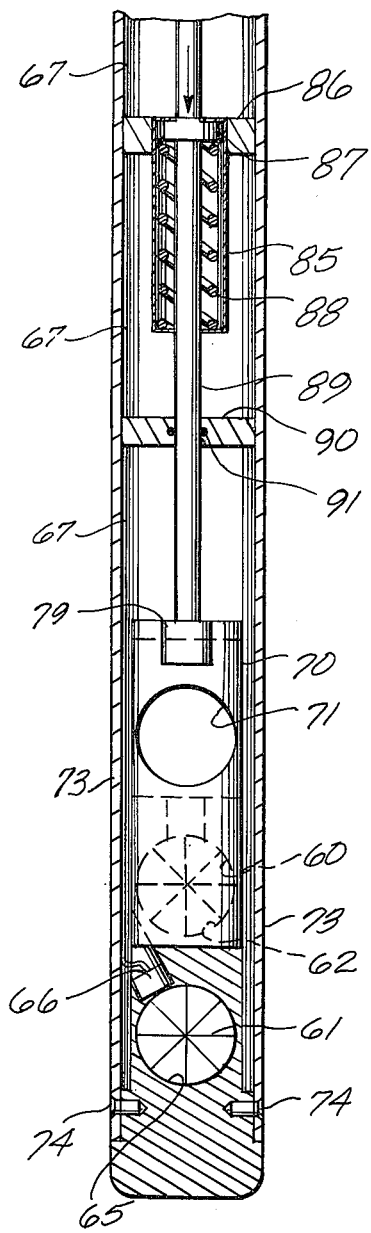
FIG. 5 is a front sectional view of the turbine flowmeter of FIG. 4.

Reference is made to FIGS. 4, 5, and 6 for a dual range flowmeter having turbine wheels 60 and 61, which are shown schematically in FIGS. 4 and 5 without their supporting bars and ball bearings that support turbine wheels 60 and 61 for free rotation. As a result of different blade pitches, turbine wheels 60 and 61 have different rotational characteristics responsive to fluid velocity, i.e, for a given fluid velocity turbine wheel 60 rotates at a lower rotational speed than turbine wheel 61. Turbine wheel 60 is disposed in a cylindrical passage 62 that extends through a cylindrical block 63 with an axis transverse to that of passage 62. A pickup coil, represented schematically at 64, lies in a recess formed in block 63 in close proximity to turbine wheel 60. Turbine wheel 61 is disposed in a cylindrical passage 65 that extends through block 63 parallel to passage 62. Fluid flows through and around passages 62 and 65. A pickup coil, represented schematically at 66, lies in a recess formed in block 63 in close proximity to turbine wheel 61. An axially movable cylindrical sheath 70 overlies and partially covers block 63. Aligned holes 71 and 72 are formed near the top of sheath 70. Sheath 70 assumes one of two positions. In the one position shown in FIGS. 4 and 5, the bottom of sheath 70 covers passage 62 and holes 71 and 72 lie above block 63. In the other position, the bottom of sheath 70 covers passage 65 and holes 71 and 72 are aligned with passage 62. In either case the fluid flowing around the passage is not diverted. A tubular housing 73, which is secured to block 63 by fasteners 74, encloses block 63 and sheath 70. Holes 75 and 76 are formed on opposite sides of housing 73 in alignment with passage 62. Holes 77 and 78 are formed on opposite sides of housing 73 in alignment with passage 65. There is an annular space between sheath 70 and housing 73. On opposite sides of housing 73, this space is filled by riders 79 and 80, which are affixed to sheath 70 to guide its axial movement. The wires for pickup coils 64 and 66, which are designated 67, also pass through the annular space as they extend upwardly toward electronic circuitry described below in connection with FIG. 6. An air cylinder 85 is attached to housing 73 by a bracket 86. Air cylinder 85 has a piston 87 and a spring 88 normally biasing piston 87 in an upward direction. One end of an arm 89 is attached to piston 87. The other end of arm 89 is attached to sheath 70. Between air cylinder 85 and sheath 70, arm 89 extends through a partition 90, where an O-ring seal 91 prevents flow of fluid from the region below partition 90 to the region above partition 90. Riders 79 and 80 and block 63 guide sheath 70 as it moves axially within housing 73.

As shown in FIG. 6, pickup coils 64 and 66 are coupled through an OR gate 95 to a frequency-to-analog (F/A) converter 96. Each time a blade of turbine wheel 60 or 61 passes pickup coils 64 or 66, respectively, during rotation, a pulse is generated by the respective pickup coil. These pulses are coupled through OR gate 95 to frequency-to-analog (F/A) converter 96 which produces an analog signal proportional to the frequency of such pulses. The output of frequency-to-analog (F/A) converter 96 is connected to a threshold detector 97. When the amplitude of the analog signal derived from the pulses of pickup coil 66 exceeds a predetermined value representative of a safe limit on the rotational speed for turbine wheel 61, threshold detector 97 produces a trigger pulse which is applied to the S input of a flip-flop 98. The output of flip-flop 98 is applied as a control signal to a solenoid valve 100, which is connected to air cylinder 85 by a hose 92 (FIG. 4) to control its operation. When the output of flip-flop 98 is energized, solenoid valve 100 supplies compressed air through hose 92 to drive piston 87 downwardly and to overcome the force of spring 88. This places sheath 70 in the position where passage 65 is covered, i.e. gated closed, and passage 62 is uncovered, i.e. gated open. When the output of flip-flop 98 is deenergized, air cylinder 85 is connected by hose 92 to the exhaust port of solenoid valve 100. The output of frequency-to-analog (F/A) converter 96 is also connected to a threshold detector 99. When the amplitude of the analog signal derived from the pulses of pickup coil 64 drops below a predetermined value representative of a safe limit on the rotational speed of turbine wheel 61, threshold detector 99 produces a trigger pulse which is applied to the R input of flip-flop 98. Flip-flop 98 is then reset, its output is deenergized, and valve 100 exhausts air cylinder 85. This returns sheath 70 to the position where passage 65 is uncovered and passage 62 is covered.

The output of OR gate 95 is also applied to frequency dividers 101 and 102. Frequency divider 101 provides a scaling factor for the pulses generated by pickup coil 64, and frequency divider 102 provides a scaling factor for the pulses generated by pickup coil 66. As a result, the pulses at the outputs of dividers 101 and 102 are to the same scale, i.e., the same constant of proportionality governs the relationship between pulse frequency and fluid velocity. The output of divider 101 is connected to one input of an AND gate 103. The output of flip-flop 98 is directly connected to the other input of AND gate 103. The output of divider 102 is applied to one input of an AND gate 104. The output of flip-flop 98 is connected through an inverter 105 to the other input of AND gate 104. The outputs of AND gates 103 and 104 are coupled through an OR gate 106 to an indicator 107. When the output of flip-flop 98 is energized, the pulses from divider 101 are coupled through AND gate 103 and OR gate 106 to indicator 107. When the output of flip-flop gate 98 is not energized, the pulses from divider 102 are coupled through AND gate 104 and OR gate 106 to indicator 107. Indicator 107 comprises conventional circuitry including counters for providing a digital or analog display of flow rate in response to the pulses applied thereto.

In operation, the flowmeter of FIGS. 4 and 5 is inserted in a fluid line by means (not shown) such that the axis of rotation of turbine wheels 60 and 61 is parallel to the direction of fluid flow through the line. Assuming initial fluid flow through the line at a low velocity, sheath 70 covers turbine wheel 60 as shown in FIGS. 4 and 5, and fluid flows through hole 77, passage 65, turbine wheel 61, and hole 78. Pickup coil 66 produces pulses at a rate proportional to the fluid velocity in the line. These pulses are coupled through divider 101 to indicator 107. As the fluid flow rate increases, the speed of rotation of turbine wheel 61 increases until a safe limit is exceeded, at which time threshold detector 97 produces a trigger pulse and sheath 70 is lowered to cover turbine wheel 61. As a result, fluid flows through hole 75, hole 71, passage 62, turbine wheel 60, hole 72, and hole 76. Pickup coil 64 produces pulses at a rate proportional to the fluid velocity in the line, but the constant of proportionality is different from the pulses produced by pickup coil 66. These pulses are coupled through divider 102 to indicator 107. When the flow rate through the line decreases once again to a value corresponding to the safe speed limitation on the rotation of turbine wheel 61, the speed of rotation of turbine wheel 60 drops to a point where threshold detector 97 generates a trigger pulse to reset flip-flop 98, which again gates passage 65 open and gates passage 62 closed. In summary, the described flowmeter functions as a dual range flowmeter. Turbine wheels 60 and 61 are alternately operative, turbine wheel 61 at low flow rates and turbine wheel 60 at high flow rates.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention as set forth in the following claims. For example, rather than a sheath or sleeve that completely surrounds the housing for the turbine wheel or wheels, a gate which simply covers and cuts off fluid flow through the passage in which the wheel is located or a gate which only partially restricts fluid flow could be employed. Further, the range of the dual range flowmeter described in connection with FIGS. 4, 5, and 6, could be extended by one or more additional turbine wheels each of which is operative only over a limited range of flow rate. Or, the principles of the invention could be applied in an in-line flowmeter, rather than a probe-type flowmeter.

The subject matter of this application is related to a copending application of James F. Guthrie, entitled "Improved Turbine Flowmeter", Ser. No. 800,562, filed on even date herewith and assigned to the assignee of this application (Attorney Docket Case 11081). One variation of the dual range flowmeter within the scope of the invention comprises two turbine wheels with different flow responsive characteristics oriented at 90° to each other on the end of a rotatable rod such as that disclosed in the referenced sole application of Guthrie. In each of the two angular positions of the rod, one of the turbine wheels is in alignment with the fluid stream and, therefore, operative while the other turbine wheel is 90° to the fluid stream and, therefore, inoperative.

We claim:

1. A turbine flowmeter comprising:
   a housing having a passage extending therethrough;
   a turbine wheel;
   means for supporting the turbine wheel for free rotation in the passage;
   means for inserting the housing in a flow line so fluid flows through the passage and around the passage, the turbine wheel intercepting fluid flowing through the passage and rotating freely responsive to the intercepted fluid;
   means for sensing the rotation of the turbine wheel;
   a normally open gate for restricting fluid flow through the passage upon closure without diverting the fluid flowing through the line around the passage; and
   means responsive to the sensing means for closing the gate to reduce the speed of rotation of the turbine wheel.

2. The turbine flowmeter of claim 1, in which the gate cuts off fluid flow through the passage when closed to reduce the speed of rotation of the turbine wheel to zero.

3. The turbine flowmeter of claim 2, in which the gate comprises a sleeve that covers the housing when closed.

4. The turbine flowmeter of claim 3, in which the inserting means comprises a rod extending into the line transverse to the fluid flow; the housing is attached to the end of the rod; and the closing means comprises an air cylinder having a piston, an arm connecting the piston to the sleeve, and means for driving the piston into a first position where the sleeve is maintained by the arm to uncover the housing and a second position where the sleeve is maintained by the arm to cover the housing.

5. The turbine flowmeter of claim 4, in which the piston is driven into the first position when the speed of rotation is below a predetermined value, and the piston is driven into the second position when the speed of rotation is above the predetermined value.

6. The turbine flowmeter of claim 5, in which the supporting means comprises a supporting bar affixed to the housing across the passage and a set of ball bearings journaling the turbine wheel in the supporting bar within the passage.

7. The turbine flowmeter of claim 5, additionally comprising:
   a second passage extending through the housing;
   a second turbine wheel having different flow responsive rotational characteristics than the first mentioned turbine wheel;
   means for supporting the second turbine wheel for rotation in the second passage;
   means for cutting off fluid flow through the second passage when the gate is open; and
   means for permitting fluid flow through the second passage when the gate is closed.

8. The turbine flowmeter of claim 7, additionally comprising second means for sensing the rotation of the second turbine wheel and means responsive to the second sensing means for opening the gate when the rotational speed of the second turbine wheel drops below a predetermined value.

9. The turbine flowmeter of claim 1, in which the gate comprises a sleeve that at least partially covers the housing when closed.

10. The turbine flowmeter of claim 1, in which the supporting means comprises a supporting bar affixed to the housing across the passage and a set of ball bearings journaling the turbine wheel in the supporting bar within the passage, and the closing means closes the gate when the rotational speed of the turbine wheel exceeds a safe limit for the ball bearings.

11. A dual range turbine flowmeter comprising:
a first turbine wheel supported for rotation about its axis in a fluid line through which a fluid stream flows;
a second turbine wheel having different flow responsive rotational characteristics than the first turbine wheel supported for rotation about its axis in the fluid line;
means for sensing the rotation of at least one of the first and second turbine wheels; and
means responsive to the sensing means for alternately permitting the fluid stream to pass either the first turbine wheel or the second turbine wheel in alignment with its axis so such turbine wheel is operative, while the other turbine wheel is inoperative without diverting the fluid flowing through the line.

12. The turbine flowmeter of claim 11, additionally comprising a housing disposed in the fluid line so fluid flows around the housing, first and second passages extending through the housing in alignment with the fluid stream through the line; the first turbine wheel being supported for rotation in the first passage, the second turbine wheel being supported for rotation in the second passage, and the means for alternately permitting the fluid stream to pass either the first turbine wheel or the second turbine wheel in alignment with its axis comprising means responsive to the sensing means for alternately opening and closing the first and second passages.

13. The flowmeter of claim 12, in which the first turbine wheel rotates at a higher speed for a given flow rate than the second turbine wheel, the opening and closing means closes the first passage and opens the second passage when the rotational speed of the first turbine exceeds a predetermined first value, and the opening and closing means opens the first passage and closes the second passage when the rotational speed of the second turbine wheel drops below a predetermined second value that is lower than the first value.

14. The flowmeter of claim 13, in which the sensing means comprises first means for generating pulses at a frequency related to the rotational speed of the first turbine wheel, second means for producing pulses at a frequency related to the rotational speed of the second turbine wheel, means for converting the pulses from the first and second producing means to the same scale, and an indicator responsive to the converting means.

15. The flowmeter of claim 14, in which the converting means comprises a first divider having a first scaling factor connected to the indicator when the first passage is open and a second divider having a second scaling factor larger than the first scaling factor connected to the indicator when the second passage is open.

16. The flowmeter of claim 15, in which the housing is cylindrical, the first and second passages have parallel axes transverse to the cylindrical axis of the housing, and the opening and closing means comprises an axially movable sheath fitting over the housing and having oppositely disposed openings, and means for moving the sheath into one of two positions, the sheath covering the second passage and lying above the first passage in one position and covering the first passage in the other position with the openings in the sheath aligned with the second passage.

17. The flowmeter of claim 12, in which the housing is cylindrical, the first and second passages have parallel axes transverse to the cylindrical axis of the housing, and the opening and closing means comprises an axially movable sheath fitting over the housing and having oppositely disposed openings, and means for moving the sheath into one of two positions, the sheath covering the second passage and lying above the first passage in one position and covering the first passage in the other position with the openings in the sheath aligned with the second passage.

* * * * *